3,058,110
SEISMIC SIGNAL DISPLAY SYSTEM
Kay N. Burns and Jesse D. Skelton, Tulsa, Okla., assignors to Jersey Production Research Company, a corporation of Delaware
Filed Sept. 15, 1958, Ser. No. 760,929
15 Claims. (Cl. 346—33)

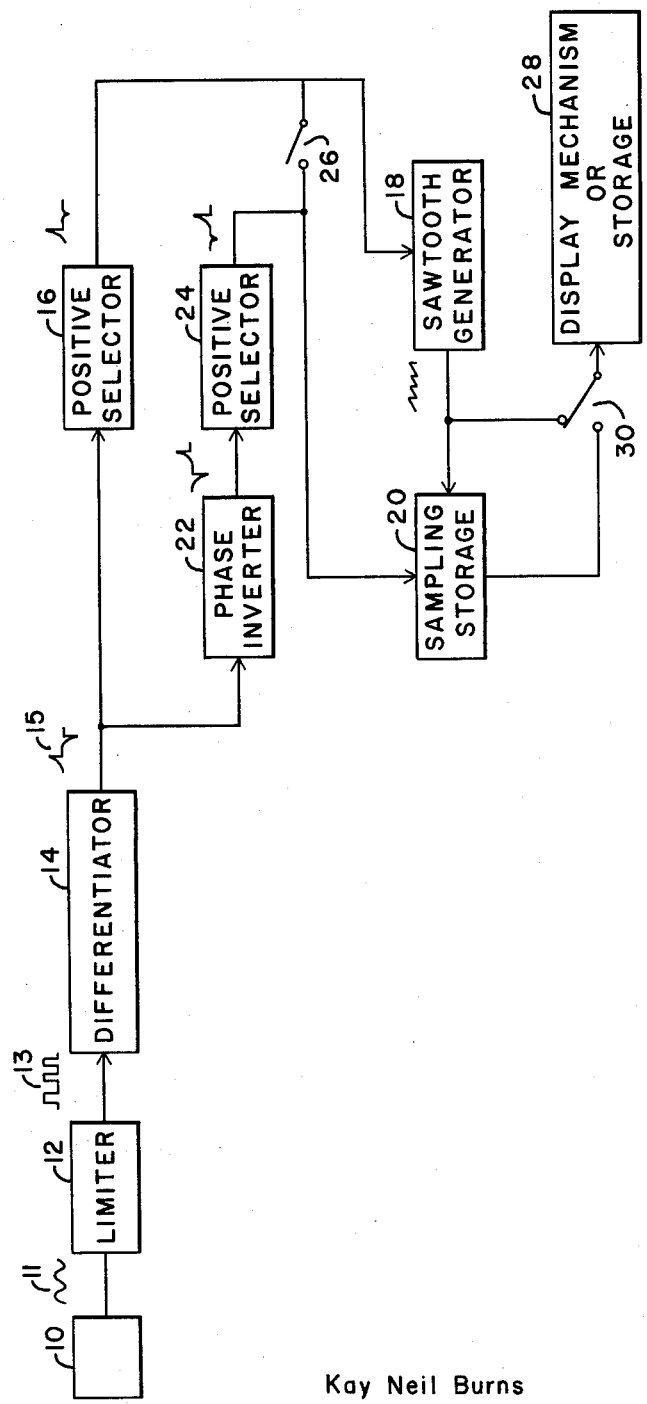
Kay Neil Burns
Jesse Daniel Skelton  Inventors
By John D. Fassett  Attorney Oct. 9, 1962  K. N. BURNS ETAL  3,058,110
SEISMIC SIGNAL DISPLAY SYSTEM
Filed Sept. 15, 1958  2 Sheets-Sheet 2
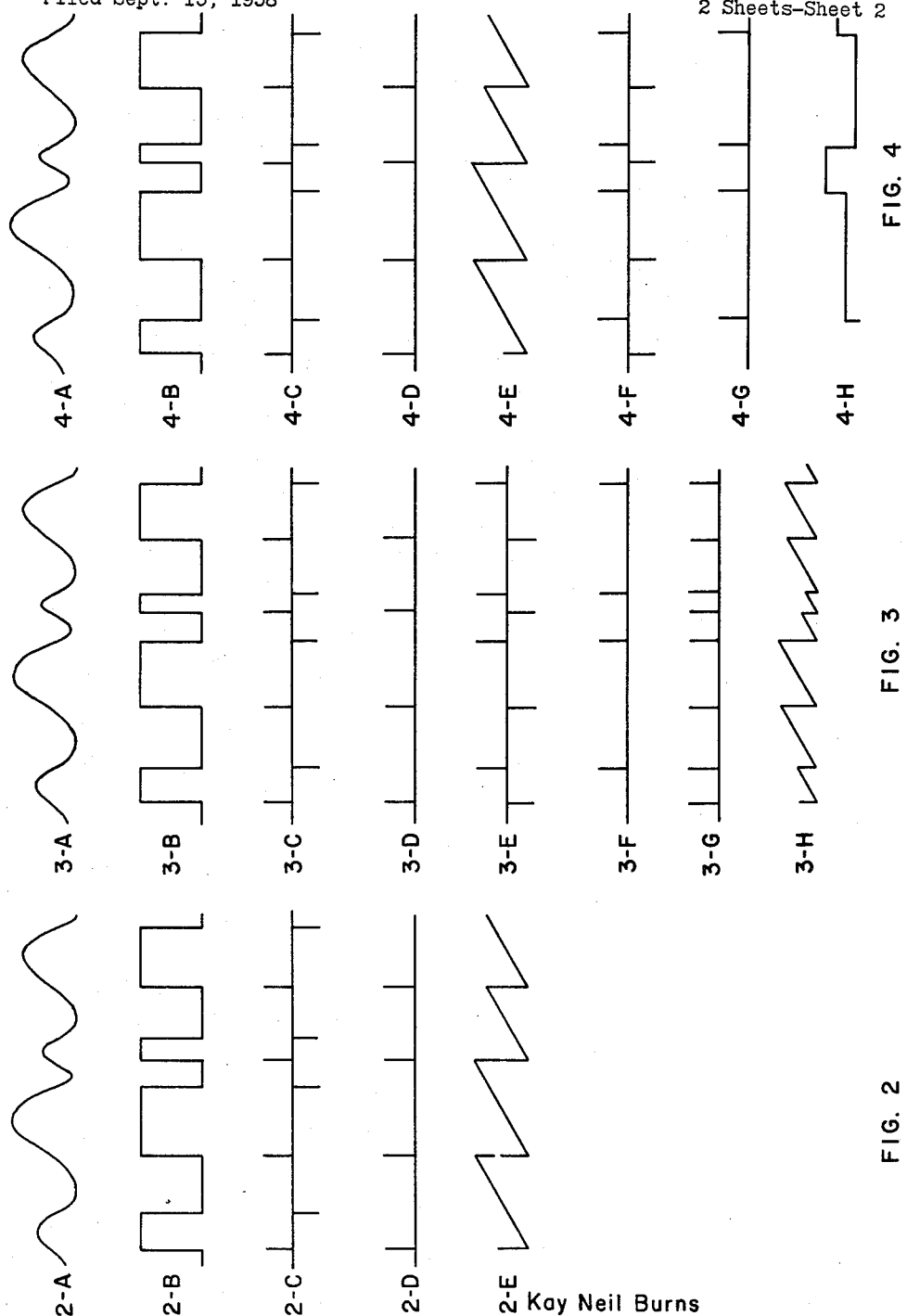
Kay Neil Burns
Jesse Daniel Skelton   Inventors
By John D. Gassett   Attorney

The present invention pertains to an improvement in systems for recording a seismic signal. The invention especially pertains to a seismic recording system which makes use of frequency information of the seismic signals.

Geophysical prospecting using artificially induced seismic disturbances has found wide application in the search for petroleum and other general products. It is a general practice to initiate an explosion or other seismic disturbance at a point near the surface of the earth and to direct seismic waves downward into the earth from that point. The waves continue to travel downward within the earth, until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance points, it is possible to detect the arrival of the reflected seismic waves at the surface of the earth. These detected waves are translated into electrical impulses which then are indicative of the character of the ground motion and are usually referred to as seismic signals and are in effect composite signals made up of a plurality of electrical signals varying in frequency and amplitude. The electrical signals oscillate by a no-signal, zero voltage, quiescent point or records base line.

The usual practice has been to examine the amplitude characteristics of the recordings made of the seismic signals by correlating the amplitudes of a plurality of traces on a seismic record. The seismic computers can obtain information as to the depth and shape of reflected surfaces.

In the past it has been the general practice to amplify the seismic signal generated by a geophone and to record the signal by means of a suitable camera. The camera may take the form of a recording oscillograph or as is more recently the case it may take the form of a magnetic or photographic recording device capable of recording a signal in reproducible form. It is this amplified record signal which seismic computers study.

Most conventional seismographs (that is, devices for recording the seismic signals) are capable of recording up to 24 or more separate seismic signals simultaneously. Thus, if a seismic observation results in 24 seismic signals being generated at as many detection stations, the resulting seismograph is a 24-trace record of the resulting 24 signals. The traces are usually arranged in a side-by-side manner; and a timing trace indicating predetermined time intervals is simultaneously recorded with the seismic signals to indicate the amount of time along each trace. Once a seismogram has been made, persons skilled in the art are generally able to determine from the data recorded on the seismogram certain characteristics of the earth substrata in the vicinity of the seismic observation.

The accuracy of exploration by seismic methods depends to a large extent upon the ability of an observer to analyze the recorded seismic information. It has been found that variable density records, in which the signal is reproduced at a photographic trace which varies in intensity along its length in proportion to the intensity of the signal, are more easily analyzed than other types of records. There are various means known for producing variable density photographic records. One such system is described in U.S. Patent No. 2,769,683 patented November 6, 1956, entitled "Variable Density Recording of Galvanometer Motion" by Jesse D. Skelton. However, known variable density methods of recording seismic information do not readily reflect changes in the frequency of the recorded signal. This shortcoming has developed into a disadvantage with the recent observation that changes in record frequency, that is frequency of the seismic signal, are related to subsurface conditions which may have a bearing on petroleum exploration. It is accordingly one of the objects of this invention to provide a seismic processing system in which frequency changes are shown as a variable density seismogram.

The present invention is concerned with a system for detecting frequency changes in seismic signals, i.e., rate a seismic signal crosses a zero base line, and then displaying this information as a variable density record in which the intensity of the record is a function of the frequency. By studying the frequency changes with respect to time of a number of correlated records, variable subsurface information can be obtained, such as velocity, porosity, bed thickness, slope, dip extent, etc., of various formations.

Briefly, this invention includes a system in which zero crossings of the seismic signals are detected and are used to trigger a generator having a linearly rising voltage ramp such as a sawtooth generator. The output signal from this generator is recorded or displayed preferably in variable density form.

In a preferred embodiment a seismic signal obtained from a seismometer magnetic tape or other reproducible record playback is fed to a limiter and differentiator circuit which produces a series of pulses corresponding in time and position to the trace zero crossings of the seismic signals. Each zero crossing pulse triggers a linearly rising voltage ramp. The next succeeding zero crossing pulse resets the ramp voltage to zero and triggers its upward rise to the next seismic trace cycle breadth. In this manner the conventional seismic trace or signal is converted to a signal made up of a series of sawtooth events. The "on time" and "final rise value" of each sawtooth event are proportional to the half-cycle breadth or frequency of the corresponding seismic cycle. The sawtooth signal thus generated is displayed in variable density form. A number of seismic signals, taken at a single observation, are converted to sawtooth traces or signals and the resulting sawtooth traces are displayed in a side-by-side variable density relationship. The variable density section thus formed is a visual presentation of the cycle breadth information of the seismic signal; frequency changes for the subsurface section are thus graphically portrayed.

At this point it is well to note that several terms in this description are assumed to have the following meaning. Thus the term "frequency" is meant to be the number of times the signal waveform or seismic signal crosses the zero signal axis per unit of time. The term "positive zero crossing" refers to the crossing of the zero signal axis of the signal waveform in which the waveform changes from a negative to a positive value and the term "negative zero crossing" shall mean that point where the seismic signal crosses the zero signal axis and changes from a positive to a negative value. The term "half-cycle breadth" shall mean the distance representative of time between a negative zero crossing and a positive crossing or between a positive zero crossing and a negative zero crossing. The term "full-cycle breadth" shall mean the distance representative of time between two successive positive zero crossings or two successive negative zero crossings.

Other objects and a fuller understanding of this invention may be had by referring to the following description and claims taken in conjunction with the accompanying drawing in which:

FIG. 1 illustrates in block diagram the electronic system which can be utilized in the practice of this invention;

FIG. 2 is a graphic representation, with the abscissa representing time and the ordinate amplitude, illustrating a comparison between a seismic signal FIG. 2-A; intermediate waveforms 2-B, 2-C and 2-D; and sawtooth trace 2-E triggered by positive slope zero crossings of the seismic signal;

FIG. 3 is a graphic representation, with the abscissa representing time and the ordinate amplitude, illustrating a comparison between a primary electric signal FIG. 3-A of the original seismic wave; intermediate waves FIG. 3-B through 3-G, and sawtooth trace 3-H triggered by zero crossings of the seismic signal; and FIG. 4 is a graphic representation, with the abscissa representing time and the ordinate amplitude, illustrating a comparison between the seismic signal 4-A, intermediate curves 4-B through 4-G, inclusive, and the cycle breadth curve 4-H.

Referring first to FIG. 1, numeral 10 represents a seismic signal source with amplification. This source may include any reproducible recording of a seismic signal such as a magnetic recording medium or the seismic signal may be taken direct from a geophone and amplified. It is contemplated that reproduced signals produced from reproducible trace recordings will be used with this invention more frequently than signals taken directly from a geophone. The seismic signal is essentially sinusoidal as illustrated in 11 or in FIG. 2-A. It may be seen that the components shown in the diagram include, in addition to the seismic signal source 10, a limiter or clipper circuit 12, a differentiator 14, a positive pulse selector or clamping circuit 16, a sawtooth generator 18, sampling storage device 20 and a display mechanism or recording device 28. Phase inverter 22 and positive selector 24 are provided in the circuitry in parallel to the selector 16 and sawtooth generator 18. A switch 26 is provided between the lead from positive selector 24 and the lead from positive selector 16. Switch 26 may be a simple two-position switch, that is, either open or closed. A two-position switch 30 is provided for connecting the displaying mechanism 28 to the sawtooth generator 18 when switch 30 is in one position and to connect the output from sample storage device 20 to the display mechanism 28 when the switch is in the other position.

Sampling storage device 20 is of a character that upon receiving the pulse from positive selector 24, it will sample or read the value of the voltage output of the sawtooth generator 18 at that instant. The sampling storage unit then has a constant voltage output signal equal to this instantaneous sampled voltage until another position pulse is received from positive selector 24 at which time another instantaneous sample voltage will be read from the sawtooth generator output and that value will likewise determine the constant voltage output of sampling unit 24 until still another pulse is received from position selector 24. This sample storage device may be a "gated" capacitor which is allowed to charge to the sample voltage and then has the charge path opened to cause the sample voltage to be held. A description of a sample circuit can be found in chapter 14 of Waveforms by Chance, Hughes, MacNichol, Sayre, and Williams, published by McGraw-Hill. Reference is especially made to FIG. 14.32 on page 528.

Display mechanism 28 may be any means for recording the signal from the sawtooth generator 16 or sample storage unit 20 as the case may be, such as a record made on a magnetic tape, on photo or electro-sensitive paper, etc. However, it will normally be desired that the output signals of sample storage 20 or sawtooth generator 18 be displayed in the form of a variable density photographic record. There are various means suitable for this purpose. One such system is described in the previously mentioned Skelton patent. Display mechanism 28 may, if desired, be of a character to display the output signals as illustrated in FIG. 2-E, 3-H or 4-H as a color presentation.

The embodiment as shown in FIG. 1 may be utilized to generate (1) full cycle breadth signals as illustrated in FIG. 2-E, (2) half-cycle breadth signals as illustrated in FIG. 3-H and (3) a pulse width and height modulated rectangular signal as illustrated in FIG. 4-H. Consideration will first be given to an explanation to an operation of the circuit which obtains a full cycle generated sawtooth trace of FIG. 2-E. In this operation switch 26 is open and switch 30 connects display mechanism 28 with the output of sawtooth generator 18. It will be assumed that the seismic signal illustrated in FIGS. 2-A, 3-A and 4-A are identical for the purpose of this description. The seismic signal is fed to limiter circuit 12 which clips and amplifies the seismic wave and has a substantially rectangular wave output form as illustrated at 13 and in FIG. 2-B. The leading edge of the rectangular waveform in FIG. 2-B corresponds in time to the positive zero crossing of the seismic signal in FIG. 2-A and the trailing edge of the rectangular waveform corresponds in time to the negative zero crossing of the seismic signal. The rectangular waveform as illustrated in FIG. 2-B is then fed to differentiator circuit 14 which generates a sharp positive pulse for each leading edge of the waveform of FIG. 2-B and a sharp negative pulse for the trailing edge. The waveform thus generated from a differentiator circuit 14 is illustrated at 15 and in FIG. 2-C. The waveform illustrated in FIG. 2-C is then fed to positive selector clamping circuit 16 which eliminates or cuts off the negative pulse and in effect has an output signal which has a rather sharp positive pulse for each leading edge of the waveform illustrated in FIG. 2-B. The output signal from positive selector circuit 16 is illustrated in FIG. 2-D. Each positive pulse as illustrated in FIG. 2-D triggers a linearly rising voltage ramp from sawtooth generator 18. The ramp continues to rise linearly until the sawtooth generator receives the next succeeding pulse which resets the generator voltage to zero and again triggers its upward rise. It is thus seen that each zero positive crossing of the seismic signal triggers a linearly rising voltage ramp which continues to rise until the next zero positive crossing pulse resets the ramp voltage to zero and triggers its upward rise to the next seismic trace cycle. As the various curves from 2-A to 2-E are drawn on the same time scale, the corresponding events of the various waveforms are ready observed.

The frequency range for most seismic signals is from about 10 to 100 cycles per second. The range of frequency which is most indicative of subsurface information is found in the range of about 25 to 80 cycles per second. Accordingly, the slope of the ramp of the sawtooth curve is selected so as to give full range of density presentation of the desired band of frequency. The display mechanism will, of course, have to be considered together with the slope of the ramp to obtain full range density presentation. For example, any voltage on the ramp greater than that representative of 80 cycles or less per second is displayed as black, and any voltage on the ramp less than a value of 25 cycles per second or more is presented as white. It is of course understood that the frequency range of interest may vary from area to area. The voltage on the ramp representative of the frequencies between the above-mentioned minimum and maximum frequencies will be displayed as a different intensity varying linearly from black through various shades of gray to white as the voltage increases. It is thus seen that a variable density presentation has been obtained which displays in a variable density form the cycle breadths or frequency of seismic traces. By processing a series of seismic traces which are so related as to constitute a seismic section, a variable density section representative of frequency of seismic traces may be made.

Attention is next directed to the operation of the components illustrated in FIG. 1 to obtain a sawtooth signal as illustrated in FIG. 3–H which has one tooth for each zero crossing of the seismic signal and may be referred to as a half-cycle breadth presentation. The operation of limiter circuit 12, differentiator circuit 14 and positive selector 16 is identical to the function as described hereinbefore. FIGS. 3–A, 3–B, 3–C and 3–D are therefore identical to FIGS. 2–A, 2–B, 2–C and 2–D. In this operation to obtain half-cycle breadths presentation switch 26 is closed; that is, the output signals from both positive selector 24 and positive selector 16 are fed to sawtooth generator 18. Switch 30 remains in a position to connect the output of sawtooth generator 18 to the display mechanism 28.

The output from differentiator 14 as illustrated in FIG. 3–C is fed to phase inverter 22 as well as positive selector 16. Phase inverter 22 inverts the waveform illustrated at FIG. 3–C and the inverted form is illustrated in FIG. 3–E. Positive selector 24 receives the inverted waveform and clips the negative portion therefrom and leaves only the positive pulse as illustrated in FIG. 3–F. With switch 26 closed, positive pulses from positive selector 24 join the positive pulses from positive selector 16 and the resulting waveform is illustrated in FIG. 3–G. This waveform which has a positive pulse for each zero crossing of the seismic signal is then fed to sawtooth generator 18. Each positive spike of FIG. 3–G triggers sawtooth generator 18 to generate a linearly rising voltage ramp. This ramp continues until the next positive spike or pulse resets the sawtooth generator to zero voltage and again triggers another linearly rising voltage ramp. It is thus seen that for each zero crossing of the seismic signal that the sawtooth generator 18 is reset to zero voltage and is triggered to produce a linearly rising voltage ramp. The sawtooth waveform thus generated as illustrated in FIG. 3–H has twice the teeth as the waveform illustrated in FIG. 2–E. In other words, the waveform of FIG. 3–H illustrates a half-cycle breadth presentation and has an upwardly rising ramp for each zero crossing of the seismic signal whereas the waveform illustrated in FIG. 2–E is a full-breadth cycle presentation which has one upwardly rising ramp for each positive zero crossing of the seismic signal. The waveform as illustrated in FIG. 3–H may be displayed in a variable density manner similar to that described above for the full-cycle sawtooth waveform illustrated in FIG. 2–E.

Attention is now directed toward the operation of the components of FIG. 1 to obtain the pulse width and height modulated signal illustrated in FIG. 4–H. In this operation switch 30 is in the position where it connects the output of sample storage device 20 with the display mechanism 28 and switch 26 is open. With switch 26 open it will be seen then that the sawtooth waveform generated by sawtooth generator 18 illustrated in FIG. 4–E will be the same as that illustrated in FIG. 2–E which is the sawtooth signal generated for the full breadth cycle crossing. FIG. 4–F illustrates the inverted signal from phase inverter 22 and FIG. 4–G illustrates the positive pulse signal from positive selector 24. The output of sample storage unit 20 is illustrated in FIG. 4–H. It will be noted that the sawtooth curve 4–E is a curve with its peaks corresponding in time to positive zero crossings. This sawtooth curve is sampled for its instantaneous value at each negative zero crossing which is illustrated by the spike in FIG. 4–G. The output signal of sample storage unit 20 is a constant voltage which is equal to the sampled instantaneous value of the sawtooth curve. The value of the output voltage is constant until the next succeeding pulse of FIG. 4–G, which is representative of the next negative zero crossing, at which time sample storage unit 20 again samples the sawtooth curve with the signal output assuming the then instantaneous voltage of the sawtooth signal. In other words, sampling storage device 20 assumes a constant voltage output which is equal to the sampled instantaneous value of the sawtooth waveform at each negative zero crossing. Storage device 20 maintains this instantaneous value until it is altered to the instantaneous value sampled at the next negative zero crossing.

The sawtooth signal is made up of a series of linearly rising ramps which are triggered by each positive crossing of the seismic signal. It is clearly seen in the curves that the sawtooth ramp is sampled at the negative zero crossing or half-cycle lengths and is held over the next full cycle. The resulting rectangular output curve from sampling storage unit 20 may be displayed in a manner similar to that described above for the display of curves 2–E and 3–H. It will be noted however that a positive cycle width is represented by a certain and fixed density during the following full cycle. In other words, the density being displayed does not vary during any cycle but rather varies from cycle to cycle.

A seismic section presented in variable density form can be prepared by using this invention. Individual signals, presented in variable density form reflecting frequency variations, are arranged in the same lateral order as the geophone locations corresponding to the seismic signals. The spacing between the variable density presentations of the seismic signals are preferably proportional to the distance between the geophone locations so as to render the final product a reasonably accurate map of a vertical cross-section of the portion of the earth under study. It is thus seen that a seismic section can be prepared in a manner such that frequencies within a seismic spectrum are laterally apparent.

It will be understood that the apparatus and system contained in the above description are merely representative or illustrative and not limitive and that numerous modifications may be made therein without departing from the scope of the invention.

The invention claimed is:

1. A method of recording a seismic signal having voltage changes from positive to negative and negative to positive which comprises recording the signal as a variable density form and varying the instantaneous intensity of the record as a function of the corresponding instantaneous time between successive positive zero crossings of said seismic signal.

2. A method of recording a seismic signal having positive zero crossings and negative zero crossings which comprises generating a linearly rising voltage ramp beginning at each positive zero crossing, resetting the ramp voltage to a predetermined value at each said positive zero crossing with the ramps resulting in a sawtooth waveform and displaying said sawtooth waveform as a variable density presentation.

3. A method as defined in claim 2 with the further improvement of presenting the sawtooth waveform as a variable color presentation.

4. A method of recording a seismic signal having zero crossings of voltage with respect to time about a zero reference line which comprises recording the seismic signal as a variable color record and varying the instantaneous color of the record as a function of the corresponding instantaneous time between successive zero crossings of said seismic signal.

5. A method of recording an electrical signal having voltage changes from positive to negative and negative to positive which comprises recording the signal as a variable density form and varying the instantaneous intensity of the record as a function of the instantaneous time between negative zero crossings of said electrical signal.

6. A method of recording a seismic signal having having positive zero crossings and negative zero crossings which comprises generating a linearly rising voltage ramp for each negative zero crossing, resetting the voltage ramp to a predetermined value at each negative zero crossing with the voltage ramps resulting in a sawtooth waveform and displaying said waveform as a variable density presentation.

7. A method as defined in claim 6 with the further improvement of presenting the resulting waveform as a variable color presentation.

8. An apparatus for recording a seismic signal which oscillates back and forth across a zero reference line which comprises in combination a differentiator means of a character to generate a sharp positive pulse for each positive zero crossing of said seismic signal and a sharp negative pulse for each negative zero crossing, a positive selector means electrically connected to said differentiator means and of a character to have an output signal which has a sharp positive pulse for each sharp positive input pulse received from said differentiator means, a generator means electrically connected to the output of said positive selector means with said generator means being of a character to generate an ouput signal which has a linearly rising voltage for each positive pulse received from said positive selector and of a further character to reset the output voltage to zero for each positive pulse so received, and recording means electrically connected to said generator.

9. An apparatus for recording a seismic signal which oscillates back and forth across a zero reference line which comprises in combination a differentiator means of a character to generate a sharp positive pulse for each positive zero crossing of said seismic signal and a sharp negative pulse for each negative zero crossing, a positive selector means electrically connected to said differentiator means and of a character to have an output signal which has a sharp positive pulse for each sharp positive input pulse received from said differentiator means, a phase inverter electrically connected to the output of said differentiator means and of a character to invert the waveform output received from said differentiator means, a second positive selector means electrically connected to the said phase inverter, said phase inverter and said second positive selector means being in parallel to said positive selector means, a generator means electrically connected to the output of said positive selector means and said second positive selector means with said generator means being of a character to generate an output signal which has a linearly rising voltage for each pulse received from positive selector means and said second selector and of a further character to reset the output voltage to zero for each pulse so received, and recording means electrically connected to the output of said generator.

10. A system for recording in variable density form on a recording medium a seismic signal which has variable time intervals between detectable significant points which comprises: means to detect the occurrence of such significant points; means to generate an output sawtooth signal which has a linearly rising voltage for each significant point and of a character to be reset to a predetermined value at each significant point; and means to record said sawtooth signal as a variable density presentation.

11. A system for recording in variable density form on a recording medium a seismic signal which has variable time intervals between detectable significant points which comprises: means to record the signal as a variable density form and means to vary the instantaneous intensity of the record as a function of the corresponding instantaneous time between successive significant points of said seismic signal.

12. A system for recording in variable color form on a recording medium a seismic signal which has variable time intervals between detectable selected significant points which comprises: means to detect the occurrence of such significant points; means to record the signal as a variable color and means for varying the instantaneous color of the record as a function of a corresponding instantaneous time between successive significant points.

13. A method of displaying a seismic signal which oscillates by a reference voltage base line and which has variable time intervals between zero crossings which comprises: detecting the occurrence of such zero crossings; exposing a recording medium; indicating on said recording medium the occurrence of such zero crossings in time sequence by exposing the recording medium with the same intensity at each such occurrence; and linearly varying the intensity of exposure between each such indication as a function of time elapsed from its immediate previous indication.

14. A method of displaying on a recording medium a seismic signal which oscillates by a reference voltage base line and which has variable time intervals between detectable events which comprises: detecting the occurrence of such events; indicating on a recording medium in time sequence the occurrence of each such event by recording on such medium the same characteristic at each such occurrence; further recording on said medium intermediate said indications; and linearly varying the character of said further recording between such indications as a function of time elapsed from the last such indication.

15. A method of recording a seismic signal which oscillates back and forth across a zero reference line which comprises: triggering a linearly rising voltage ramp for each zero crossing with the next succeeding zero crossing re-setting the ramp voltage to a predetermined value and triggering the upward rise again of said ramp voltage and displaying the resulting waveform as a variable color presentation.

References Cited in the file of this patent

UNITED STATES PATENTS

| | | |
|---|---|---|
| 2,572,788 | Weighton | Oct. 23, 1951 |
| 2,644,133 | Soukaras | June 30, 1953 |
| 2,791,288 | Meier | May 7, 1957 |